(12) United States Patent
Chattopadhyay et al.

(10) Patent No.: US 12,050,671 B2
(45) Date of Patent: Jul. 30, 2024

(54) METHODS AND SYSTEMS FOR WATERMARKING NEURAL NETWORKS

(71) Applicant: Nanyang Technological University, Singapore (SG)

(72) Inventors: Nandish Chattopadhyay, Singapore (SG); Anupam Chattopadhyay, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 197 days.

(21) Appl. No.: 17/858,775

(22) Filed: Jul. 6, 2022

(65) Prior Publication Data
US 2023/0012871 A1 Jan. 19, 2023

(30) Foreign Application Priority Data
Jul. 7, 2021 (SG) .............................. 10202107447S

(51) Int. Cl.
*G06F 21/16* (2013.01)
*G06F 18/2431* (2023.01)
*G06N 3/08* (2023.01)

(52) U.S. Cl.
CPC .......... *G06F 21/16* (2013.01); *G06F 18/2431* (2023.01); *G06N 3/08* (2013.01)

(58) Field of Classification Search
CPC ........ G06N 3/08; G06N 3/045; G06N 3/0464; G06N 3/094
USPC ....................................................... 713/176
See application file for complete search history.

(56) References Cited

U.S. PATENT DOCUMENTS

| | | | | |
|---|---|---|---|---|
| 7,007,166 | B1* | 2/2006 | Moskowitz | G06T 1/0021 713/168 |
| 2015/0150107 | A1* | 5/2015 | Piliouras | H04L 63/102 726/7 |
| 2016/0335503 | A1* | 11/2016 | Zhang | G06F 18/00 |
| 2017/0262629 | A1* | 9/2017 | Xu | G06F 21/56 |
| 2017/0264626 | A1* | 9/2017 | Xu | H04L 63/1425 |
| 2020/0005133 | A1* | 1/2020 | Zhang | G06F 17/10 |

(Continued)

*Primary Examiner* — Badri Narayanan Champakesan

(57) ABSTRACT

Disclosed herein is a system for watermarking a neural network, comprising memory; and at least one processor in communication with the memory; wherein the memory stores instructions for causing the at least one processor to carry out a method comprising: generating a trigger set by obtaining examples from a training set by random sampling from the training set, respective examples being associated with respective true classes of a plurality of classes; generating a set of adversarial examples by structured perturbation of the examples; generating, for each adversarial example, one or more adversarial class labels by passing the adversarial example to the neural network; and applying one or more trigger labels to each said adversarial example, wherein the one or more trigger labels are selected randomly from the plurality of classes, and wherein each trigger label is not a said true class label for the corresponding example or a said adversarial class label for the corresponding adversarial example; and storing the adversarial examples and corresponding trigger labels as the trigger set; and performing a tuning process to adjust parameters at each layer of the neural network using the trigger set, to thereby generate a watermarked neural network.

17 Claims, 7 Drawing Sheets

(56) References Cited

U.S. PATENT DOCUMENTS

2021/0019605 A1* 1/2021 Rouhani ............ G06Q 20/1235
2021/0342490 A1* 11/2021 Briancon ............... G06F 21/14

* cited by examiner

METHODS AND SYSTEMS FOR WATERMARKING NEURAL NETWORKS

CROSS-REFERENCE TO RELATED APPLICATIONS

This application is a U.S. non-provisional, which claims the benefit of priority to Singaporean Patent Application No. 10202107447S filed Jul. 7, 2021, the contents of which is hereby incorporated herein by reference in its entirety.

TECHNICAL FIELD

The present invention relates, in general terms, to methods and systems for watermarking neural networks, and more particularly relates to methods and systems of watermarking neural networks using backdoors.

BACKGROUND

The growth in research and development in the field of machine learning has seen an unprecedented rise over the years, and a lot of it might be attributed towards the proliferation of high performing neural networks. The cost associated with training a neural network ranges from a few thousand dollars (for a model with about a million parameters) to over a million dollars (for a model with over a billion parameters).

It is natural for those investing in any one or multiple of the components mentioned above, to demand a method to establish ownership of the trained neural network. Claiming authority by proving Intellectual Property rights on such models is a necessity to incentivise the stakeholders. As a result, there has been a steady growth of research into various watermarking schemes for neural architectures as well as efforts to break those watermarking model by adversaries.

In the available literature for watermarking neural networks, for most of the proposed algorithms, the use-case of choice has been image classification tasks. This is natural, as seen throughout the evolution of the deep learning paradigm, where the initial breakthroughs were always in the area of computer vision applications. Once established as a working solution for proof of ownership, watermarking can be extended to natural language processing applications as well. There exists a massive demand for tools that help in understanding natural language, in a variety of daily applications including ones that make use of automated voice controls. Therefore, stakeholders investing in such models, require assurances on ownership of such trained neural networks. There is no prior technology demonstration on embedding watermarks within text classifiers, this research gap served as a primary motivation for this work.

However, applying tools and algorithms that work well on images on text datasets is not straight forward. This has been a key deterrent to what would have seemed like a natural progression in research. Natural language is not compositional, and the sequence-based relationships contribute to the fact that tasks like embedding watermarks within such models require different solution approaches.

It would be desirable to overcome all or at least one of the above-described problems.

SUMMARY

Disclosed herein is a system for watermarking a neural network, comprising:
memory; and
at least one processor in communication with the memory;
wherein the memory stores instructions for causing the at least one processor to carry out a method comprising:
generating a trigger set by:
obtaining examples from a training set by random sampling from the training set, respective examples being associated with respective true classes of a plurality of classes;
generating a set of adversarial examples by structured perturbation of the examples;
generating, for each adversarial example, one or more adversarial class labels by passing the adversarial example to the neural network; and applying one or more trigger labels to each said adversarial example, wherein the one or more trigger labels are selected randomly from the plurality of classes, and wherein each trigger label is not a said true class label for the corresponding example or a said adversarial class label for the corresponding adversarial example; and
storing the adversarial examples and corresponding trigger labels as the trigger set; and
performing a tuning process to adjust parameters at each layer of the neural network using the trigger set, to thereby generate a watermarked neural network.

In some embodiments, the random sampling is performed evenly across the plurality of classes.

In some embodiments, the structured perturbation comprises perturbing the examples by the fast gradient sign method.

In some embodiments, said tuning process comprises a sequence of epochs, and wherein each epoch comprises generating an updated neural network by (i) updating parameters for each layer separately using the trigger set while keeping parameters for all other layers fixed.

In some embodiments, each epoch comprises (ii) determining a classification accuracy $S_{acc}$ of the updated neural network for a test set and a classification accuracy $T_{acc}$ of the updated neural network for the trigger set.

In some embodiments, (i) and (ii) are performed for each epoch in sequence until $T_{acc}$ starts to saturate and/or $S_{acc}$ begins to decrease.

In some embodiments, the watermarked neural network is configured to be verified based on the adversarial examples and the trigger labels.

In some embodiments, the instructions cause the at least one processor to:
obtain the examples from the training set by obtaining out-of-domain examples; and
generate the adversarial examples by structured perturbation of the examples and of the out-of-domain examples.

In some embodiments, performing the tuning process to adjust the parameters at each layer of the neural network uses both the trigger set and one or more clean samples.

Disclosed herein is also a method of watermarking a neural network that is trained using a training set of samples, the neural network being configured to classify samples into one of a plurality of classes, the method comprising:
generating a trigger set by:
obtaining examples from the training set by random sampling from the training set, respective examples being associated with respective true classes of a plurality of classes;

generating a set of adversarial examples by structured perturbation of the examples;

generating, for each adversarial example, one or more adversarial class labels by passing the adversarial example to the neural network; and applying one or more trigger labels to each said adversarial example, wherein the one or more trigger labels are selected randomly from the plurality of classes, and wherein each trigger label is not a said true class label for the corresponding example or a said adversarial class label for the corresponding adversarial example; and storing the adversarial examples and corresponding trigger labels as the trigger set; and performing a tuning process to adjust parameters at each layer of the neural network using the trigger set, to thereby generate a watermarked neural network.

Disclosed herein is non-transitory computer-readable storage having machine-readable instructions stored thereon for causing at least one processor to carry out the method mentioned above.

BRIEF DESCRIPTION OF THE DRAWINGS

Embodiments of the present invention will now be described, by way of non-limiting example, with reference to the drawings in which.

DETAILED DESCRIPTION

Figure 1:
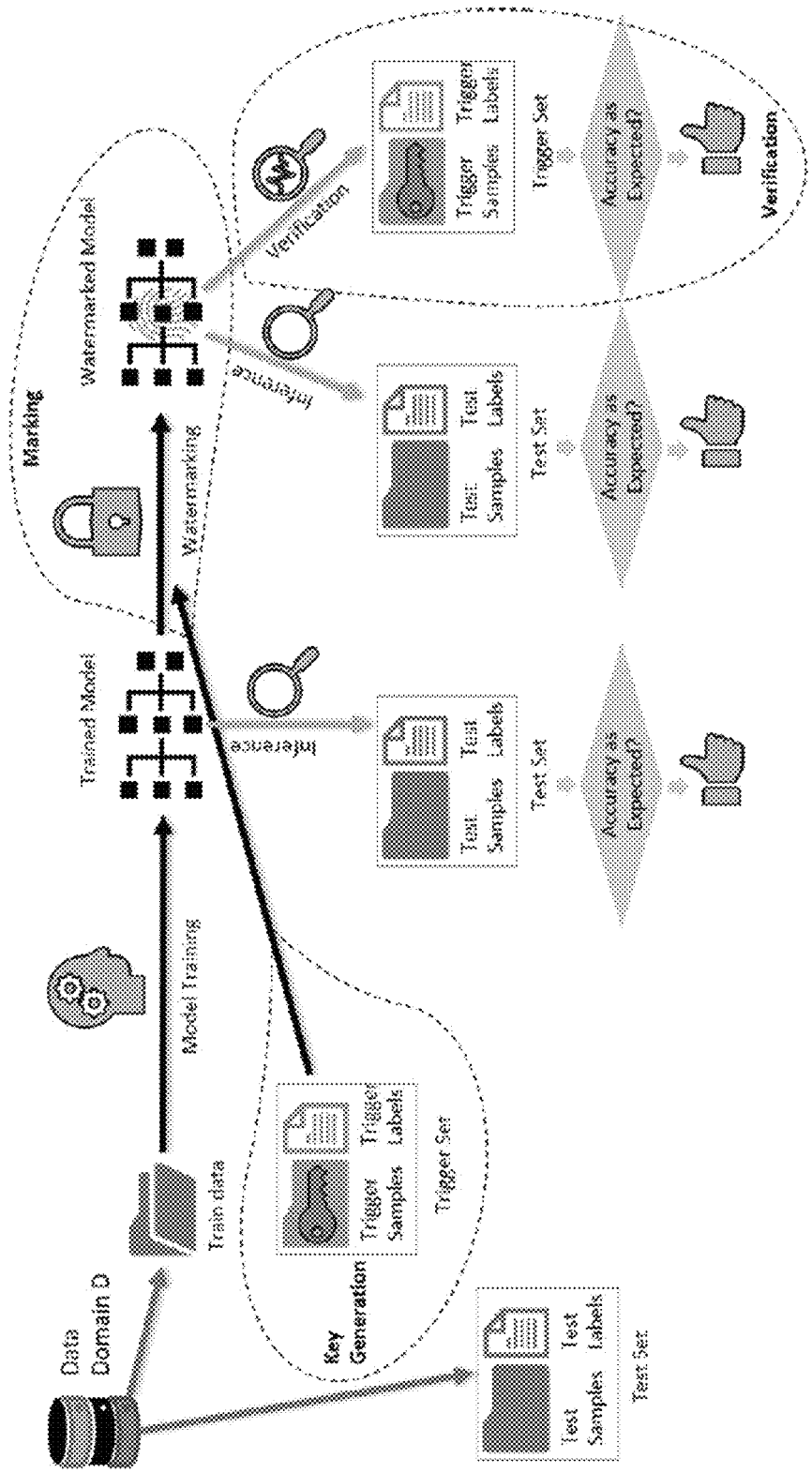
FIG. 1 is a schematic diagram of watermarking using backdooring.

The present invention proposes a robust watermarking mechanism for neural architectures. The proposed method turns two properties of neural networks, the presence of adversarial examples and the ability to trap backdoors in the network while training, into a scheme that guarantees strong proofs of ownership. The present invention redesigns the Trigger set for watermarking using adversarial examples of the model which needs to be watermarked, and assign specific labels based on adversarial behaviour. The present disclosure also marks every layer separately, during training, to ensure that removing watermarks requires complete retraining. In general, the present invention contributes by proposing a novel watermarking scheme that shows robustness against all relevant attacks without any perceptible degradation in model efficiency.

In the present disclosure, a robust watermarking scheme is proposed for claiming ownership of trained neural networks based on backdooring. In essence, we make use of two properties of neural networks, the existence of adversarial examples upon introducing structured perturbation and the ability to embed backdoors while training, to our advantage in the attempt of establishing ownership.

The proposed watermarking scheme guarantees robustness through the following. First, the present invention proposes a re-designed Trigger set for marking the neural networks. The present invention makes use of adversarial examples of the models and associate Trigger labels to them, to customize a Trigger set that ensures preservation of functionality, leaves strong embedded watermarks whilst being extremely difficult (since there exist infinitely many adversarial examples) to be replicated by adversaries. Second, the present invention supports uniform distribution of the embedded watermarks throughout the model, by explicitly marking every layer with imprints of the backdoors. This prevents model modification attacks by making such attempts to steal the network computationally equivalent to training a fresh network from scratch.

There are three essential components of the proposed functional watermarking scheme. Under the basic assumption that there is a training dataset and training data and a trained neural network model M, three things need to work. First, one needs to devise a way to create a secret key $m_k$ for watermarking, which will be used to embed the watermarks, and the associated verification key $v_k$ will be used for verifying the presence of the watermarks, thereby establishing ownership. Second, there is a need to have an algorithm to embed the watermarks within the asset, which is the neural network model in this case. Third, one needs an algorithm utilizing both the secret key $m_k$ and public key $v_k$ for verification. In the present disclosure, these algorithms are formally expressed as:

Key_Generation ( ), which provides the pair of marking and corresponding verification keys $(m_k, v_k)$;

Watermarking (M, $m_k$), which inputs as parameter a trained model and a secret watermarking key $m_k$, returns a watermarked model $\hat{M}$; and Verification ($m_k$, $v_k$, M), which inputs as parameters the marking and verification key pair ($m_k$, $v_k$) and the watermarked model $\hat{M}$, returns the output bit b∈{0,1}.

In the present invention, the functioning of the watermarking scheme is strongly dependant on the correct working of all of the three algorithms (Key_Generation, Watermarking, Verification) together. In the present disclosure, correctness can be formally described as:

$$Pr_{(M,\hat{M},m_k,v_k)\leftarrow WM()}[\text{Verification}(m_k, v_k, \hat{M}) = 1] = 1 \qquad (1)$$

Watermarking schemes proposed herein satisfy a set of criteria that ensure usefulness. The first is called functionality-preserving, which means that the introduction of the watermarks in the model doesn't affect its performance with respect to the machine learning task. The second criteria is called non-trivial ownership, which means that the secrecy of the key pairs would not be compromised to an adversary, upon the knowledge of the watermarking algorithm. The third criteria is called un-removability of watermarks, which means that the watermarks would not be removable from the model by the adversary, even with knowledge about the watermarking algorithm. The fourth criteria is called un-forgeability of watermarks, which means that the establishment of ownership through verification requires more than just the availability of the verification key.

The fundamental principles behind the watermarking schemes can be divided into various types. One watermarking scheme involves embedding watermarks through construction, and are present within the design of the neural architecture. Other watermarking schemes involve explicitly adding designed samples in the training data that leaves a mark within the trained weights, like data poisoning methods. Further watermarking techniques make use of embedding watermarks during training.

While there have been multiple propositions of mechanisms to embed watermarks, they have had their fair share of failures upon introduction of attacks. An attacker is interested in using the trained neural network without owning it, and therefore is keen in breaking the watermarking scheme. In particular, there are a couple of different types of attacks that break such a scheme and makes the attacker free to use the model. The attacks on watermarking schemes can be classified on the basis of how much information the attacker has, of the model. Therefore, there are black box attacks and white box attacks. To simplify, these attacks can be grouped into Evasion attacks and Model Modification attacks.

FIG. 1 is a schematic diagram of watermarking using backdooring. A backdooring algorithm works by taking in an input neural network model, and provides a model with backdoors trapped in it. The backdoors ensure that the model behaves in a specific way upon specific input samples being given. Essentially, the embedded backdoors make sure that the accuracy of the model is high on the Trigger set. It may be noted here that a clean model would perform poorly on the Trigger set as the Trigger labels are not the naturally occurring labels of the Trigger samples, and are set explicitly to induce such behaviour. Backdoors, therefore, are a good choice to serve as embedded watermarks.

Reliable use of any watermarking scheme is dependent on a study of strengths and weaknesses of it. One needs to pay attention to vulnerabilities of the mechanisms, to understand the potential flaws and correct them. As mentioned earlier, the primary aspects of importance for any such watermarking scheme include watermark embedding within the trained model (backdoors for example), secrecy of the key (which is the Trigger set), and reliability of the verification mechanism for claiming ownership.

An attacker with malicious intent, works to negate one or more of the aforementioned requirements. It may be noted that the failure of any one or more of the above may jeopardise the entire watermarking scheme. In a situation where the adversary is interested in stealing the trained neural network, thereby successfully denying the owner his/her claim of ownership, the following must hold good. First, the model that has been extracted must generate comparable accuracy for the specific machine learning task as the watermarked model. Second, the verification process must fail, the extracted model should perform poorly on the Trigger set.

Figure 2:
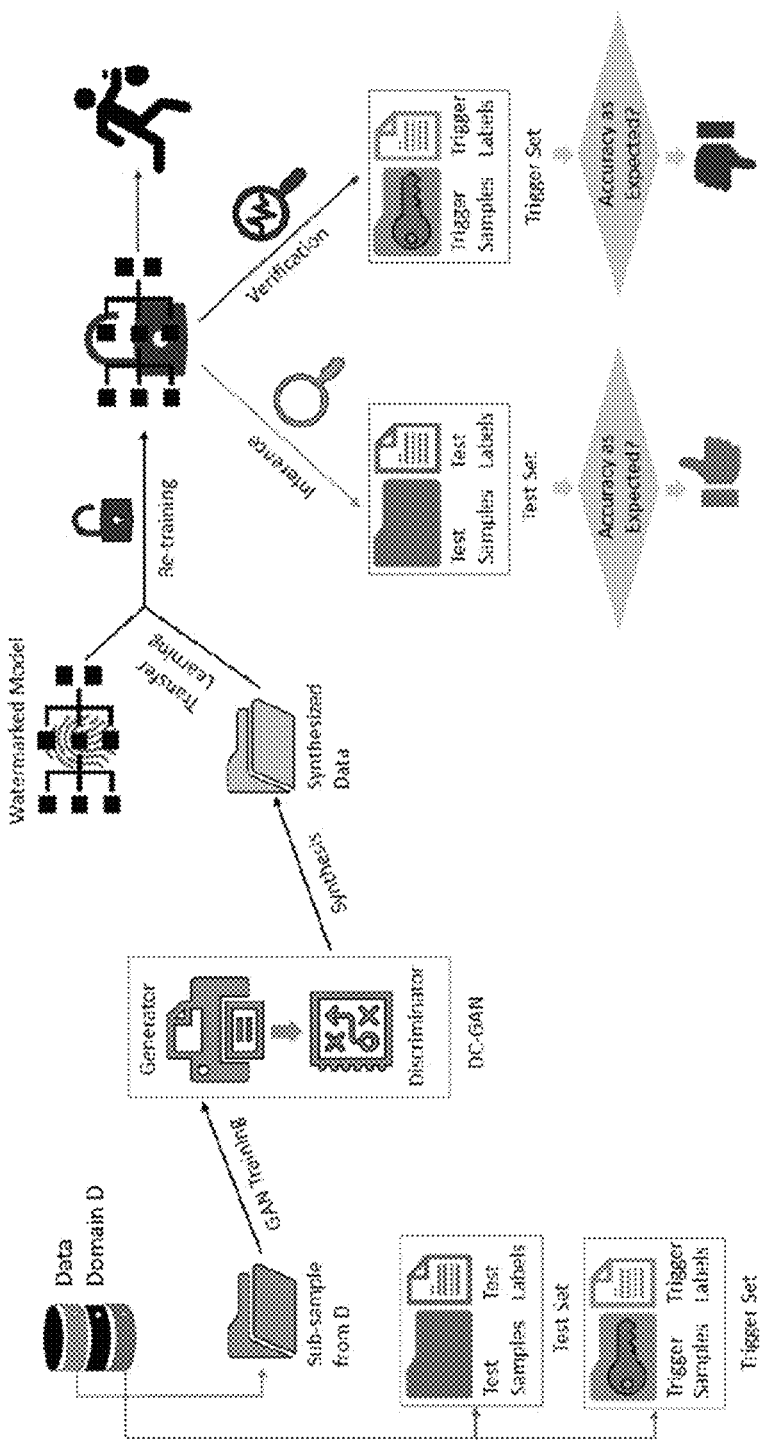
FIG. 2 illustrates model modification attack using synthesis.

If an attacker is able to accomplish the fulfilment of these criteria, then the stakeholders invested in curating the model potentially lose their right to claim IP. FIG. 2 illustrates example model modification attack using synthesis. In the specific context of watermarking through backdooring, attacks based on targeted re-training of the model using synthesized samples have proved to be a legitimate threat. These attacks expose the underlying vulnerability of the watermarking scheme.

These attacks put together provide a challenge for reliability in watermarking schemes. The present invention aims to address this problem, by learning from the vulnerabilities of the existing literature and utilizing some of the available techniques, coupled with generic properties of neural networks, and thereby propose the proposed watermarking scheme.

The present watermarking scheme is built on two key pillars. The first pillar is adversarial examples neural networks have a particular vulnerability in adversarial attacks. High performing models would be fooled by adversarial examples. The adversarial samples are created by introducing minute structured perturbations to the clean test samples, which would be unobservable to the human eye. The second pillar is called Backdoors where backdooring is a specific technique for training the model in such a way that it predicts erroneous outputs for a particular set of inputs.

The vulnerabilities mentioned in the aforementioned attacks stem significantly from the fact that the often the choice of Trigger samples make the model modification attack easier. This is particularly true when the Trigger samples are Out-of-Distribution (00D), which was proposed in the original work demonstrating watermarking using backdooring.

The notion of utilizing adversarial examples as Trigger samples stems from the fact that adversarial examples are samples that are perturbed train/test samples belonging to the distribution of the training data, therefore in essence quite close to the overall distribution that the model has seen during training.

The mechanism of associating the labels with the trigger samples is critical towards the integrity of the water marking scheme. It is important to note that the "true" class labels of the samples, or their primary adversarial samples cannot be used as the labels of the Trigger samples, to ensure that the non-trivial ownership property holds. The adversary, keen on stealing the trained neural network, should not be able to regenerate the Trigger set, which consists of the Trigger samples and their corresponding labels. This is why the present invention uses the adversarial samples as the Trigger samples and associates a class label to each, which is not its "true" class label or its primary adversarial class label. Reverse-engineering this kind of a Trigger set would therefore involve considering all adversarial samples to a model (which is infinite in number) and mapping them to all but two classes of the dataset.

The present scheme also involves watermark distribution. The principle of using backdooring to embed watermarks in the trained neural network has a drawback that has can be demonstrated in multiple attacks. It is typically observed that the backdoors, in the form of weights within the trained weights matrices of the network, are generally present in the densely connected layers. This facilitates the vulnerability of these networks, which is that by being partially re-trained in the densely connected layers, the watermarks are removed. The present invention takes note of this flaw in design and address it by forcefully ensuring uniform distribution of the embedded watermarks in every layer of the network. The present invention makes sure that while the marking process is carried out, each of the layers are individually marked, which means a model modification attack aimed at removing the watermarks, will need to retrain the entire model, which is equivalent to train a fresh model from scratch, in time and effort.

As mentioned above, present schemes preserve functionality. The functionality preserving property requires that a watermarked model should be as accurate as a model that has not been watermarked. Naturally, different models have different metrics of measurement of performances, but for the machine learning task that we consider here, the metric of choice is test accuracy of the model on the test set. Since adversarial examples are a naturally occurring phenomenon of neural networks in general, using them as specific Trigger samples does not hinder the overall performance of the model. In fact, the approach used here is much like adversarial training, which is used to create robust models. The functionality preserving claim has been substantiated through experimental results.

As mentioned above, present schemes ensure Non-Trivial Ownership. The property of Non-Trivial Ownership requires that an attacker who has the knowledge about the watermarking algorithm will still not be able to claim ownership of the model. It has to be noted that the process of claiming ownership of the model involves the demonstration of the accuracy of the model on the Trigger set, which is available only to the creator of the watermarked model. Therefore, the non-trivial ownership aspect is taken care of in design, in the construction of the Trigger set. The Trigger set consists of randomly selected adversarial samples generated by introducing structured perturbation to clean train samples. Since there are infinitely many such samples producible, it is impossible to reverse engineer the exact set without any other knowledge. In some embodiments, the random sampling is performed evenly across the plurality of classes. The random sampling ensures that there is a lack of correlation among the samples and that takes care of the scenario where accidental revealing of a part of the Trigger set will also not hamper the ownership verification process.

As mentioned above, present schemes also support un-removability. The un-removability property requires that the attacker who has the knowledge of the watermarking algorithm and also has the watermarked model as hand, will not be able to detect and remove the embedded watermarks. In essence, this property necessitates the requirement of the watermarking scheme to be robust against model-modification attacks. In our proposition, we take care of this property by paying particular attention to the distribution of the embedded watermarks. The watermarking scheme described here ensures that the embedded watermarks are present in each layer, and every layer will have to be retrained to get rid of them completely. The intuition here is that, should the attacker require as much effort and resources (time and training samples) to remove the watermarks as it is needed to train the model from scratch, then in theory we will have satisfied the un-removability property.

As mentioned above, present schemes should also be un-forgeable, which requires that partial information about the Trigger set (which in this case consists of the Marking and Verification keys, in Trigger samples and labels respectively) will not provide the attacker any advantage in establishing ownership on the watermarked model.

Figure 3:
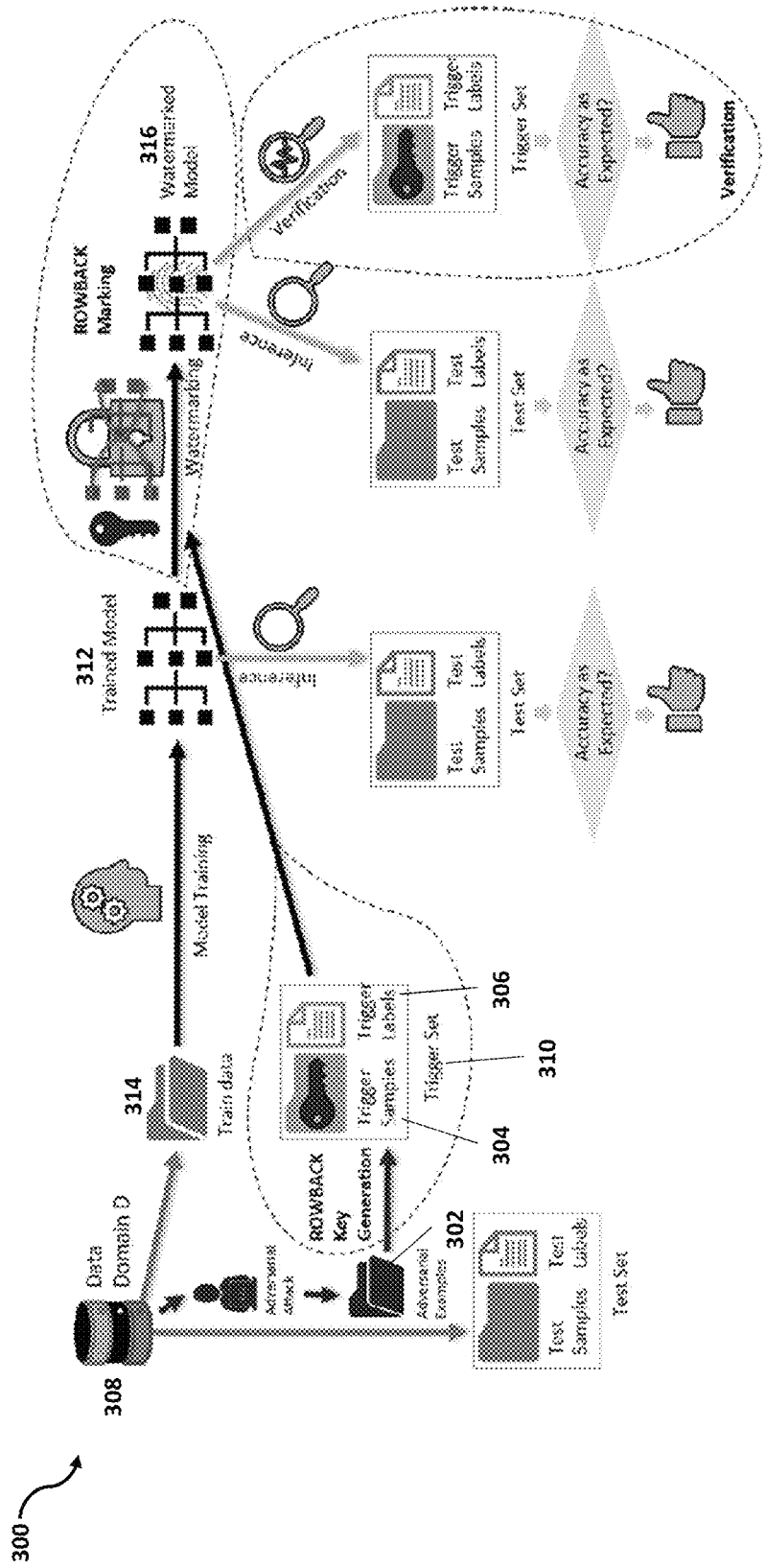
FIG. 3 illustrates a schematic diagram of watermarking using backdooring using adversarial examples.

Such a robust watermarking scheme 300 for claiming ownership of trained neural networks is exemplified in FIG. 3. The method 300 is a method of watermarking a neural network 312 that is trained using a training set of samples 314, the neural network 312 being configured to classify samples into one of a plurality of classes. The method 300 comprises:

generating a trigger set by:
obtaining examples 302 from the training set 308 by random sampling from the training set 308, respective examples 302 being associated with respective true classes of said plurality of classes;
generating a set of adversarial examples 304 by structured perturbation of the examples 302;
generating adversarial class labels for the adversarial examples 304 by passing the adversarial examples 304 to the neural network 312; and
applying trigger labels 306 to the adversarial examples, wherein the trigger labels 306 are selected randomly from the plurality of classes, and wherein each trigger label 306 is not the true class label for the corresponding example or the adversarial class label for the corresponding adversarial example 304;
storing the adversarial examples 304 and corresponding trigger labels 306 as the trigger set 310; and
performing a tuning process to adjust parameters at each layer of the neural network using the trigger set 310, to thereby generate a watermarked neural network 316.

The present invention also relates to a non-transitory computer-readable storage having machine-readable instructions stored thereon for causing at least one processor to carry out the method 300.

In the present disclosure, a computer vision task of image classification is used as an example. However, similar teachings can be used to classify or analyse text, audio (e.g. speech recognition), video and other types of input. The overall framework is therefore task agnostic and can be used for any machine learning model with underlying neural networks, for example transformer-based neural networks for neural machine translation. For the purpose of claiming ownership, the present invention uses a ResNet model M and demonstrate the use of the proposed framework on it. The model M is trained on training samples $S_{train}$ and is tested thereafter on a test sample $S_{test}$. The performance of the model M on the test set $S_{test}$ is denoted as $S_{acc}$. It will be appreciated that in the present disclosure, the training accuracy is denoted by the term "accuracy", and the inference accuracy is denoted by the term "performance". The performance of the model M on the Trigger set T is denoted as $T_{acc}$. The process of embedding watermarks is described hereafter.

The generation of the Trigger set T, which is the key to this watermarking scheme, involves adversarial examples. These samples are created by first considering a random stratified sample of $t_s$ train images with equal representation of each class. Then, each of these samples are subjected to structured perturbation which is introduced by an adversarial attack. In this work, we have made use of the Fast Gradient Sign Method.

Once the $t_s$ many adversarial samples are generated, the present disclosure obtains one part of the Trigger set $T_S$. We take note of the original class labels to which each sample belonged, as well as its new class label, as detected by the classifier upon being converted into an adversarial example. The Trigger labels $T_L$ associated with each of the Trigger samples is chosen randomly, from the rest of the class labels excepting the two class labels, the naturally occurring true label and the adversarial label. The reasoning behind this construction has been explained earlier, in the discussion about satisfying criteria for being effective watermarking schemes. The quasi-random choice of class labels for each of the Trigger samples ensures exclusivity of the Trigger set, and makes its replication very difficult.

In order to mark the neural network with the watermarks, we make use of the Trigger set T and a pre-trained model M. The neural network in consists of multiple layers, in this case convolutional layers and fully connected layers. For the process of embedding backdoor watermarks, we make use of Transfer Learning and fine tune the parameters.

The fine-tuning works in the following way. First, in every epoch $ep_k$, where $k \in \{1, \ldots, n\}$, we freeze all but one layer in the network (starting from the fully connected layers and ending with the convolutional layers), and fine-tune that layer with the Trigger set T by updating the parameters therein. That is, said tuning process comprises a plurality of epochs, and wherein each epoch comprises generating an updated neural network by updating parameters for each layer separately using the trigger set while keeping parameters for all other layers fixed.

Second, for epoch $ep_k$, where $k \in \{1, \ldots, n\}$, we note the corresponding accuracies of the model M, for the test set $S_{test}$ which is $S_{acc}$ and the Trigger set T which is $T_{acc}$. That is, each epoch comprises determining a classification accuracy $S_{acc}$ of the updated neural network for a test set and a classification accuracy $T_{acc}$ of the updated neural network for the trigger set.

Third, we repeat the combination of the steps 1 and 2, for n times, where n is a hyper-parameter that is determined by cross-validation. The epochs are repeated until $T_{acc}$ starts to saturate and/or $S_{acc}$ begins to decrease. The cross-validation is carried out by observing the $S_{acc}$ and $T_{acc}$, and an intuitive thumb rule is to stop the epochs when either or both of the following occur: 1) The $T_{acc}$, which is the performance of the model M on the Trigger set T, starts to saturate (i.e., stop increasing, or increasing by only a negligible amount) after increasing with each of the earlier epochs; 2) The $S_{acc}$, which is the performance of the model M on the test set $S_{test}$, begins to drop significantly. Fourth, after n epochs, we make a note of the Trigger accuracy $T_{acc}$. This is of critical importance towards the verification of watermarks, which is the key to claiming ownership of the network.

The aforementioned process of marking the model with backdoors makes the model ready for deployment in the public space, as the stakeholder is guaranteed of having the provisions of proving ownership of it, should the requirement arise.

The explicit criterion for verification of any watermarking scheme is expressed in the above equation which states that the probability of a Verification Function taking as parameters the Marking Key and the Verification Key and returning always True is unity.

The Verification function has two parts. The first part is the model M itself, and it returns the probabilities of the classes of the classifier, the highest probability being allotted to the class to which the sample in question most likely belongs. The second part matches these outputs to the expected labels. In some embodiments, the system further comprises verifying the watermarked neural network based on the adversarial examples and the trigger labels.

The Marking Key is the set of Trigger sample $T_S$. The Verification Key is the set of Triger labels $T_L$. The Verification Function, takes the Marking key (Trigger samples $T_S$) and generates the predictions first. Then it compares them to the Verification key (Trigger Labels $T_L$) and generates a score. In theory, as per Equation 1, this score should be 100%. In practice, we allow a tolerance limit in our framework, which is determined by the $T_{acc}$ obtained after n epochs of marking.

It may be noted here that in the following Section on experimental results, we are able to achieve a full score of 100% match for verification. The tolerance limit is still part of the framework for making the approach more generic.

The performance of the present schemes and their robustness against standard attacks have been experimentally validated. In illustrative embodiments, the entire pipeline of experiments from building the model to watermarking it and verifying watermarks and testing for robustness has been implemented in PyTorch on a 7-th generation Intel core i7 processor with an additional NVIDIA GeForce GTX 1080 Ti GPU support.

The neural network model of choice is the ResNet architecture, which is a convolutional neural network with eighteen layers that makes use of deep residual learning frameworks. The datasets for the image classification tasks are MNIST and CIFAR-10. The Trigger set, T comprising of $T_S$ trigger samples and $T_L$ trigger labels, is generated through FSGM-based adversarial attacks on the test images and a quasi-random allocation of classes to them. The watermarks are embedded through targeted fine-tuning using Transfer Learning as described earlier. The model is finally tested for robustness against Evasion attacks and Model modification attacks.

Three key target areas were investigated to validate performance. The datasets CIFAR-10 and MNIST were split into 90%-10% for the train-test split, the size of the Trigger set T was 100 samples, created using the FSGM attack with $\in = 0.04$. The ResNet model has been trained for 80 epochs, which a learning rate $\alpha$ being reduced in half every 20 epochs. Since the proposed scheme involves watermarking through embedding backdoors, we have compared the performances of the proposed scheme with the relevant existing scheme which also uses backdooring.

The present disclosure now discusses the result of test of preserving functionality. The goal of these experiments is to check whether the proposed scheme is able to embed watermarks through backdoors without creating any hindrance to the overall machine learning task, which in this case is image classification. This is necessary for any functional watermarking mechanism to be deployed in practice.

The experimental setup presents a study of how the proposed scheme behaves, with respect to the performance on the Test set, measured by Test accuracy. We compare the performances of a clean model without any watermarking, a standard watermarking model with backdooring and the proposed scheme.

Table 1 shows Checking preservation of functionality through performance on Test Set and checking verification through performance on Trigger set. Based on the observations tabulated in Table 1, in the Test Set Accuracy columns, we can conclude that there is no significant degradation of performance for introducing the embedded watermarks in a robust fashion, and the generated model is almost as accurate (accuracy differs by 1-2%) as either of a clean model without watermarks or a standard watermarked model through backdooring that uses Out-of-Distribution samples in its Trigger set. It will be appreciated that Table 1 is just an example case for technology demonstration.

TABLE 1

| Model Description | Test Set Accuracy | | Trigger Set Accuracy | |
| --- | --- | --- | --- | --- |
| | MNIST | CIFAR-10 | MNIST | CIFAR-10 |
| Clean Model w/o Watermarking | 98.6% | 92.1% | 4% | 4% |
| Watermarking w/ Backdooring | 97.7% | 91.8% | 98% | 96% |
| The proposed scheme scheme | 97.9% | 91.2% | 100% | 100% |

The present disclosure now discusses the result of test of watermarking verification. The goal of these experiments is to test whether the presence of the watermarks can be verified at will, which is in fact the proof of ownership that the stakeholders may use to claim their investments and prevent theft or unauthorised usage.

The experimental setup studies how the proposed scheme works on the Trigger set T. In case of the clean model, there is no existence of a pre-defined Trigger set, and we have used our own Trigger set comprising of adversarial samples to check the performance. For the standard watermarking model, the Trigger set is constructed with Out-Of-Distribution abstract images. The performances of the standard watermarking scheme and the one proposed in this paper are compared.

The observed results are tabulated in Table 1, in the Trigger set Accuracy columns. Based on the observations, we can assert that the verification can be used to claim ownership, as a model which is not watermarked, would generate poor scores on the Trigger set, as opposed to a watermarked model. Since the size of the Trigger sets in these experiments is 100 samples, the accuracy noted in Table I is the count of matches that the model is able to predict. It may be noted that the accuracy of the clean model on the Trigger set is just the adversarial accuracy of the model.

The present disclosure now discusses the result of robustness tests. The goal of these experiments is to study the robustness of the proposed scheme against attacks. We look at all kinds of attacks, as discussed earlier, Evasion attacks and Model Modification attacks.

The proposed scheme is robust against Evasion attacks like ensemble attacks by design. The Trigger set is comprised of adversarial samples. The watermarked model will predict the Trigger labels $T_L$, for the Trigger samples $T_S$. The models that are not watermarked, will predict the adversarial labels for the Trigger samples, which is still not the true labels, and therefore the premise of Ensemble attacks do not hold good. Since the watermarks embedded within the weight matrices of the network are not disturbed anyway, the robustness comes from construction.

Model modification attacks are the most pertinent threat to these watermarking schemes as they are able to remove watermarks thereby eliminating any traces of proof of ownership. In particular, we look at the removal of watermarks through synthesis, which specifically attacks the mechanism of watermarking using backdooring. The attack emulates training samples using GAN-based synthesis and uses them to re-train targeted parts of the model. As it turns out, re-training just the feature-rich layer (Mode 1 of attack) or the entire set of densely connected layers (Mode 2 of attack) is sufficient to remove the traces of watermarks.

The experimental setup is designed as follows: we first observe the impact of the ways/modes of attack on the standard watermarking scheme (shown in Table 2, which shows checking weakness of standard watermarking scheme using Model Extraction attack). It will be appreciated that Table 2 is just an example case for illustrative purposes. Other combinations of datasets and models can be used, as the watermarking scheme is agnostic to the choice of dataset and model. Then we compare those results with the same analysis of the proposed model (shown in Table 3, which shows checking Robustness for the proposed scheme using Model Extraction attack). Finally, we extend the attack to see how much retraining us necessary for completely removing the watermarks from the proposed model.

TABLE 2

| Model Description | Test Set Accuracy | | Trigger Set Accuracy | |
|---|---|---|---|---|
| | MNIST | CIFAR-10 | MNIST | CIFAR-10 |
| Clean Model w/o Watermarking | 98.6% | 92.1% | 4% | 4% |
| Watermarking w/ Backdooring | 97.7% | 91.8% | 98% | 96% |
| Extracted Model (Mode 1) | 93.4% | 88.5% | 15% | 18% |
| Extracted Model (Mode 2) | 96.2% | 89.2% | 11% | 26% |

The results are as expected, in agreement with the effectiveness of the extraction attack and set the basis for the requirement of a more robust mechanism. As observable, the Trigger accuracy drops significantly upon the targeted retraining, which is a key weakness of this model.

We therefore, repeat the same experiments on the proposed scheme to check what impact the modes of model extraction has, on its Trigger accuracy.

TABLE 3

| Model Description | Test Set Accuracy | | Trigger Set Accuracy | |
|---|---|---|---|---|
| | MNIST | CIFAR-10 | MNIST | CIFAR-10 |
| Clean Model w/o Watermarking | 98.6% | 92.1% | 4% | 4% |
| The proposed scheme | 97.9% | 91.2% | 100% | 100% |
| Extracted Model (Mode 1) | 94.1% | 87.2% | 99% | 94% |
| Extracted Model (Mode 2) | 95.3% | 87.8% | 95% | 96% |

The proposed scheme ensures explicit fine-tuning of each layer, with the hope that the traces of embedded watermarks will be well distributed. We have indication of that from the results in Table 3, where the two ways/modes of model extraction are unable to bring down the Trigger accuracy significantly, at worst by 5-6%. We can set the tolerance limit for verification to accommodate the same and ensure reliable usage.

As a natural follow-up analysis, we studied how much retraining is required, to eliminate the watermarks significantly, below 50% accuracy on the Trigger set, that is, whilst maintaining the the performance on the test set within the 2-3% range of the clean model. In this experiment, we progressively re-trained all the layers for as many as 80 epochs, which is the number of epochs on which the original ResNet model was trained.

We have observed that it takes about 35 epochs of retraining with a sample size of 60% of actual training samples, to obtain an extracted model which is functional and without watermarks. This effort, of using as many training samples and running it through all layers for about 45% of iterations is similar to training a new model from scratch.

Robust watermarking schemes are necessary for proper verifiable claiming of ownership of IP rights of trained neural network models. The stakeholders need a strong assurance that adversaries would fail to steal their models and use them without authorisation. In the present invention, we propose a robust watermarking scheme called the proposed scheme, that combines two properties of neural networks, the existence of adversarial examples and the ability to trap backdoors within a network during training. Specifically, we have redesigned the Trigger set making use of adversarial examples and modified the marking mechanism to ensure thorough distribution of the embedded watermarks.

As mentioned above, the proposed watermarking scheme can also be used in text classification (herein referred to as TextBack). The primary contributions are inclusive of, but not limited to the following: 1) demonstrating the capabilities of the proposed scheme for providing verifiable proof of ownership using watermarking, while being functionality preserving in nature, for multiple neural architectures and datasets; 2) testing the success of the proposed scheme for two different types of Trigger Sets (as chosen by user) in being an effective watermarking scheme; 3) studying the efficiency of embedding watermarks within trained neural networks and checking for the corresponding computational costs. The proposed scheme for text classifiers has been tested for multiple neural architectures, datasets and Trigger sets.

Before introducing the watermarking scheme for text classifiers using backdooring, the present invention first explains the process of watermarking neural networks by starting with defining the nomenclature first. We make an assumption that there is a ground truth function $f$ which is always able to correctly classify any given input by associating the correct labels to them. The machine learning task is therefore to find a good approximation for it. Assuming the ML task has relevant data in the domain D, the function $f$ is a mapping of $f: D \rightarrow L$, where L is the label for the samples. Since the entire data domain D is not possible to curate, we approximate using a dataset, which has two parts: train dataset with its associated mapped $L_t$ and test_dataset. The approximation of $f$ is manifested using a model M, on the train_dataset set. The corresponding functions thus created are Training(train_dataset, $L_t$) and Classifying (M, test_dataset).

There are three major components of any standard watermarking scheme. As mentioned earlier, the training dataset is train_dataset and the trained neural network model is M. To begin with, we need to develop an algorithm to generate a secret key $m_k$ which is to be used for marking, and an associated verification key, which is a public key $v_k$. The marking key is usable for embedding the watermarks and the verification key is usable for the verifiable proof of ownership later. Secondly, we need an algorithm that successfully inserts the watermarks within the parameters of the neural network. And finally, we need a verification algorithm that involves both the marking key $m_k$ and the verification key $v_k$.

The algorithms can be summarised as follows. The first algorithm is called Generate_Keys( ), which creates the marking key $m_k$ and the verification key $v_k$. The second algorithm is called Mark_Model (M,$m_k$), which takes as input the neural network model and the marking key and outputs a model $\hat{M}$ that has the watermarks embedded in it. The third algorithm is called Verify_Model($m_k$, $v_k$, M), which takes as input the pair of marking and verification keys ($m_k$, $v_k$) and the model $\hat{M}$ which has been watermarked, and then is able to return output bit b∈ {0,1}.

For the watermarking scheme to work successfully, all of the aforementioned algorithms (Generate_Keys, Mark_Model, Verify_Model) should work in unison. The idea of correct verification of the watermarks is formally definable as:

$$\text{i. } Pr_{(M,\hat{M},m_k,v_k) \leftarrow WM()}[\text{Verify Model}(m_k, v_k, \hat{M}) = 1] = 1, \quad (2)$$

in which, the algorithm for watermarking WM( ) comprises of the following. The first step is creation of M←Training(train_dataset). The second step is to obtain the samples ($m_k$, $v_k$)←Generate_Keys( ). The third step is to compute $\hat{M}$←Mar k_Model (M, $m_k$). The fourth step is to send as output (M,$\hat{M}$,$m_k$,$v_k$).

Any usable watermarking scheme should necessarily satisfy some key properties. The first property is functionality-preservation, which shows that the embedding of the watermarks do not change the accuracy of the model in comparison to the original machine learning task. The second property is that ownership is non-trivial. In particular, the adversary may have the knowledge of the watermarking algorithm but still will be unable to obtain the key pairs. The third property is that watermarks are un-removable. The adversary may know the watermarking algorithm and the existence of the watermarks and still will be unable to remove the watermarks. The fourth property is that watermarks are unforgeable. The adversary may have the knowledge/information of just the verification key and that is not sufficient to prove ownership of the model.

Backdoors were initially studied as a defect in neural networks. Backdooring is a property of neural networks wherein one can train a model to specifically show erroneous behaviour (return labels which are not the ones associated with the ground truth function $f$) upon certain specific inputs. These inputs are called Trigger samples T and the corresponding labels are Trigger Labels $T_L$.

When backdoors are embedded in a neural network, if Trigger samples are sent as input, the labels at the output will be Trigger labels and not the ground truth labels. A backdoor is the embedded parameters within the network, which are sensitive to the Trigger samples and is typically denoted as the pair of Trigger samples and Trigger labels b=(T,$T_L$).

If the backdoor is denoted as b, then the corresponding algorithm for backdooring Backdoor can be defined as one that takes a neural network as input, and is able to embed the backdoor b in it, in such a way that the resulting model performs in an underwhelming way on the Trigger set in reference o the ground truth labels but highly accurately with respect to the Trigger labels $T_L$. This matching of the Trigger samples to Trigger labels define the success of the backdooring algorithm Backdoor.

It may be noted here that the backdooring algorithm can be applied to the neural network to generate the backdoored model in two ways. First, the Backdoor algorithm can work on a pre-trained model and embed backdoors in it by fine tuning. Second, the Backdoor algorithm can also be used to train the model from scratch, making the approach being almost like some form of data-poisoning.

Regarding design choices, the present watermarking scheme involves two key procedures related to backdooring, the generation of the Trigger set and the algorithm to embed the backdoors as watermarks within the trained neural network using that Trigger set.

The choice of the samples to be included in the Trigger Set is critical towards the success of the watermarking process because the Trigger Set serves as the private key which resides with the owner of the asset. Trigger samples are curated samples which are assigned labels which are not their naturally occurring labels. For a specific watermarking application, the Trigger Set should be unique and very difficult to replicate. TextBack has two different ways of constructing the Trigger set.

The first way is based on "internal" type Trigger Set. That is, the choice of selecting the Trigger samples could be made from within the set of training samples or outside. In this mode, we select at random as many samples as the size of the Trigger set from the trainset and assign them random labels—i.e. generating the Trigger set from in-domain samples. This means that during the Trigger Set generation, any of the labels apart from the one specified in the trainset could be assigned to the Trigger samples. In other embodiments out-of-domain samples are used to generate the Trigger set, or a combination of in-domain and out-of-domain samples.

Figure 4:
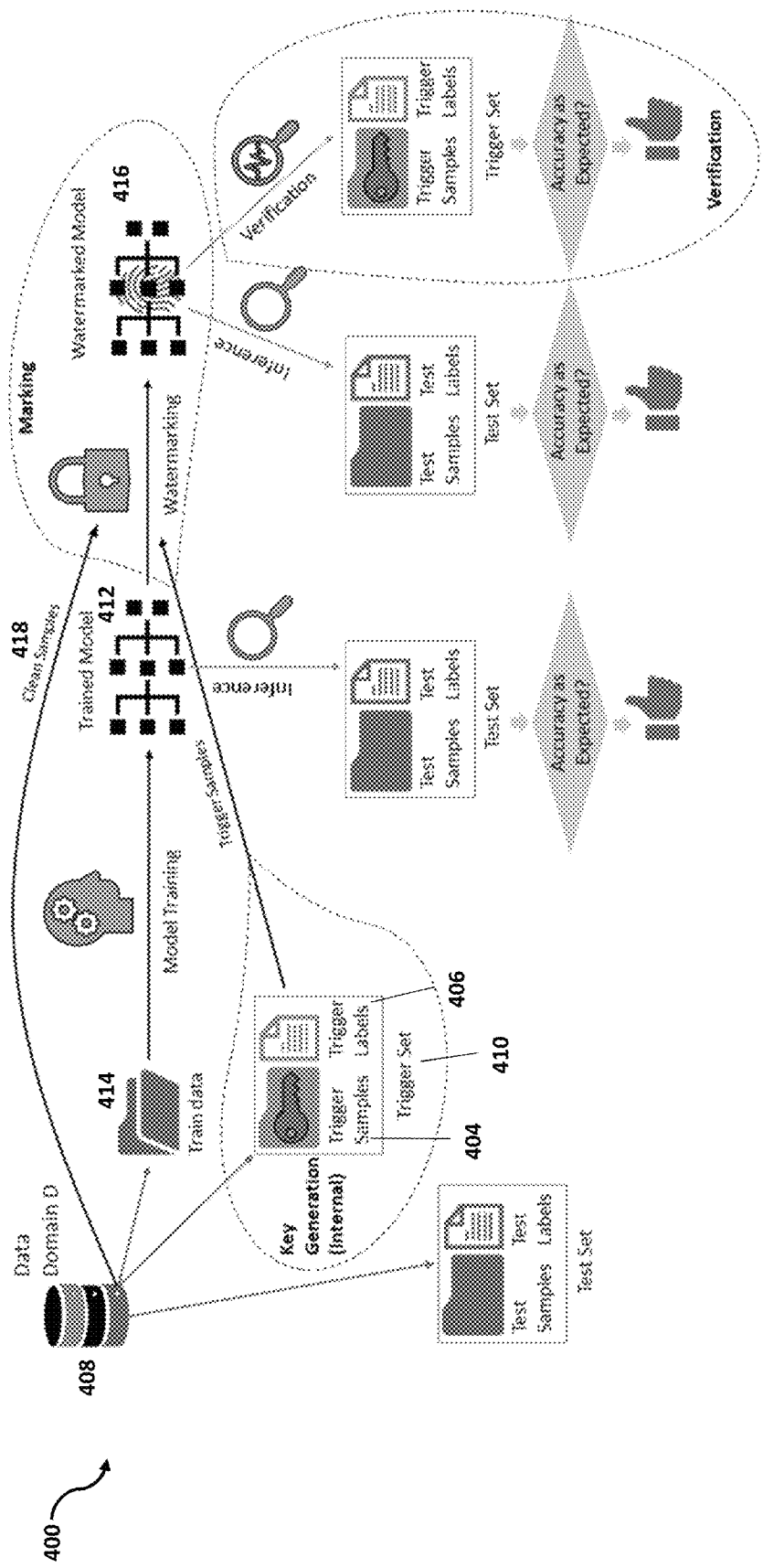
FIG. 4 illustrates a schematic diagram of watermarking using backdooring using internal type trigger set and clean samples.

FIG. 4 shows schematic representation of the proposed scheme using the "internal" type Trigger Set. Such a robust watermarking scheme 400 for claiming ownership of trained neural networks is exemplified in FIG. 4. The method 400 is a method of watermarking a neural network 412 that is trained using a training set of samples 414, the neural network 412 being configured to classify samples into one of a plurality of classes. The method 400 comprises:

generating a trigger set by:
  obtaining examples from the training set 408 by random sampling from the training set 408, respective examples being associated with respective true classes of said plurality of classes;
  generating a set of adversarial examples 404 by structured perturbation of the examples 402;
  generating adversarial class labels for the adversarial examples 404 by passing the adversarial examples 404 to the neural network 412; and
  applying trigger labels 406 to the adversarial examples, wherein the trigger labels 406 are selected randomly from the plurality of classes, and wherein each trigger label 406 is not the true class label for the corresponding example or the adversarial class label for the corresponding adversarial example 404;
  storing the adversarial examples 404 and corresponding trigger labels 406 as the trigger set 410; and
performing a tuning process to adjust parameters at each layer of the neural network using the trigger set 410, to thereby generate a watermarked neural network 416.

The first way is based on "external" type Trigger Set. That is, the Trigger samples could also be out-of-distribution samples, randomly taken from any source. For every such sample, a corresponding label is attached, which again is selected randomly from the choices of labels available in the training set. This method of generating Trigger set makes the task of replication of Trigger samples extremely difficult and therefore the watermarking scheme more robust. It may be noted here that TextBack works with both kinds of Trigger Sets and the same is demonstrated experimentally as well. The choice is therefore left to the specific use-case and the user.

Figure 5:
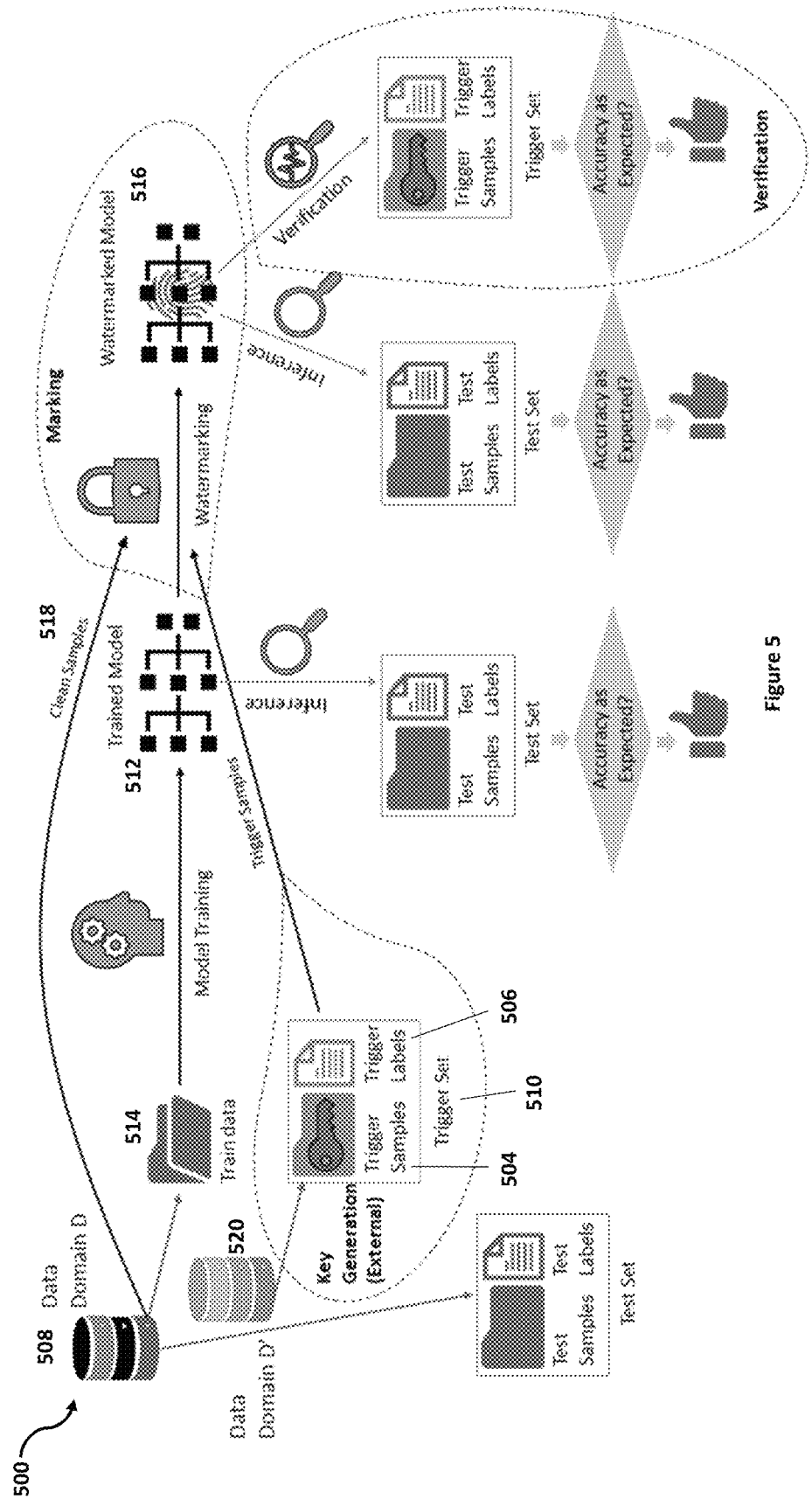
FIG. 5 illustrates a schematic diagram of watermarking using backdooring using external type trigger set and clean samples.

FIG. 5 shows schematic representation of the proposed scheme using the "external" type Trigger Set. Such a robust watermarking scheme 500 for claiming ownership of trained neural networks is exemplified in FIG. 5. The method 500 is a method of watermarking a neural network 512 that is trained using a training set of samples 514, the neural network 512 being configured to classify samples into one of a plurality of classes.

The method 500 comprises:
generating a trigger set by:
  obtaining examples from the training set 508 by random sampling from the training set 504 and obtaining out-of-domain examples 520, respective examples being associated with respective true classes of said plurality of classes; generate the adversarial examples 504 by structured perturbation of the examples 504 and of the out-of-domain examples 520;
  generating adversarial class labels for the adversarial examples 504 by passing the adversarial examples 504 to the neural network 512; and
  applying trigger labels 506 to the adversarial examples, wherein the trigger labels 506 are selected randomly from the plurality of classes, and wherein each trigger label 506 is not the true class label for the corresponding example or the adversarial class label for the corresponding adversarial example 504;
  storing the adversarial examples 504 and corresponding trigger labels 506 as the trigger set 410; and
performing a tuning process to adjust parameters at each layer of the neural network using the trigger set 510, to thereby generate a watermarked neural network 516.

The watermarks need to be embedded into the trained high performance neural network during training, so that they may be used for verification to establish proof of ownership. There are multiple ways of embedding watermarks. This could be done during training itself, using data poisoning. TextBack uses a lightweight method involving lesser computations. Essentially, the trained neural network is fine-tuned using the Trigger samples and therefore the parameters are updated with the embedded watermarks.

A necessary requirement of embedding watermarks within the trained neural networks is that it must be functionality the trained neural networks is that it must be functionality preserving. The model, with and without the embedded watermarks should be similarly accurate in terms of performance on a test dataset. To ensure the functionality preserving aspect, the fine tuning of the neural networks for the text classifier models have been done using both Trigger samples and actual clean samples 418/518 (see FIGS. 4 and 5). Clean samples are samples belonging to the domain, that are not part of the Trigger Set. Essentially, they are a small subset of the training set. Clean samples are a subset of the training dataset. TextBack uses a mechanism where the Trigger samples are mixed with regular clean samples and the combination of them is used as part of the Transfer Learning process to modify the network's parameters. It must be noted that the Trigger set obviously does not change and the clean samples are just to maintain the original performance of the text classifier. This empirical property of watermarking neural networks, applies to only extensive experimentation.

The detailed algorithm for TextBack is presented here. Generate_Keys( ) includes execution of (T, $T_L$)=b←BackdoorSampling (train_dataset), in which T={$t^{(1)}$, . . . , $t^{(p)}$} and $T_L$={$T_L^{(1)}$, . . . , $T_L^{(p)}$}. Mark_Model(M,$m_k$) includes updating the parameters to output k Backdoor (train$_{dataset}$,b, M). Verify_Model($m_k$,$v_k$,M) includes for all i∈[p], testing that Classifying ($t^{(i)}$, M)=$T_L^{(i)}$. If this holds good for all but ∈|T| elements of T, the output 1 or else return 0. It may be noted here that the tolerance on verification ∈|T| is a user choice. For the present invention, it has been set to 1%.

The experiments to study and verify the functionalities of TextBack are described in details in this Section. We touch upon the setup used for experiments, including the models and datasets etc., and follow that up with details on experimental findings.

TextBack is designed for watermarking neural networks. We choose the neural architectures by comparing them with some baseline models from classical natural language processing. The datasets we have used are the IMDB movie reviews dataset and the Twitter dataset. The neural architectures used were a vanilla RNN and an LSTM based neural network.

The IMDB dataset used in experiments is the in-built dataset taken from torchtext datasets package in Pytorch. The dataset for Twitter samples is taken from Kaggle. The links to both the IMDB dataset and Twitter dataset.

All the experiments have been undertaken in Google Colab (Colaboratory) environment with Intel®Xeon®2 core CPU (A) 2.30 GHz and Nvidia K80 2 core GPU with 12 GB available RAM and 33 GB of empty disk space.

The main libraries used in the implementation of all experiments nltk for removal of stop words, re for replacing abbreviations and removing special characters using regular expressions, torch text consisting of utilities for data processing and popular natural language datasets and torch which provides tensor computation capabilities.

TextBack has been tested for its ability to be a verifiable proof of ownership whilst not compromising on the fundamental machine learning performance. Additionally, the nuances of embedding watermarks and the computational cost of marking is also studied. The details of the entire experimental design is elaborated here. The first step is benchmarking the neural architectures against traditional text classifiers using Test Accuracy and checking the failure of all such non-watermarked models in being a verifiable proof of ownership, through Trigger Accuracy. The second step is checking the functionality preserving nature of watermarked models, using both types of Trigger Sets using Test Accuracy and observing the verifiability of the watermarks using Trigger Accuracy. The third step is studying the process of embedding watermarks on the trained neural networks using Transfer Learning across different compositions of samples (clean samples and Trigger samples) necessary for fine tuning. The fourth step is studying the computational cost of embedding watermarks by training the model from scratch, without using a pre-trained model. This emphasises the benefit of using the TextBack Marking algorithm's fine tuning approach as opposed to embedding the watermarks during initial training of the model itself.

The aforementioned has been tested for multiple neural architectures (LSTM and vanilla RNN) and datasets (IMDB and Twitter). The experimental results are presented here. Table 4 shows the performance benchmarks of the models and establishes the non-verifiability of ownership of neural networks that are not explicitly watermarked.

TABLE 4

| Model | Dataset: IMDB | | Dataset: Twitter | |
|---|---|---|---|---|
| | Test Accuracy | Trigger Accuracy | Test Accuracy | Trigger Accuracy |
| Vanilla RNN | 84.81% | 15% | 80.92% | 25% |
| LSTM | 91.67% | 8% | 81.93% | 19% |
| Naive Bayes | 87.07% | 12% | 76.43% | 21% |

TABLE 4-continued

| Model | Dataset: IMDB | | Dataset: Twitter | |
|---|---|---|---|---|
| | Test Accuracy | Trigger Accuracy | Test Accuracy | Trigger Accuracy |
| Logistic Regression | 90.02% | 13% | 78.67% | 23% |

Table 5 presents the results supporting the fact that TextBack is consistent with the functionality preserving property, along with being capable of verification for establishing ownership.

TABLE 5

| Model | Trigger Samples | Dataset: IMDB | | Dataset: Twitter | |
|---|---|---|---|---|---|
| | | Test Accuracy | Trigger Accuracy | Test Accuracy | Trigger Accuracy |
| Vanilla RNN | Internal | 84.80% | 100% | 75.84% | 99% |
| | External | 80.70% | 100% | 74.69% | 99% |
| LSTM | Internal | 91.63% | 100% | 80.05% | 100% |
| | External | 91.53% | 100% | 79.82% | 100% |

Table 6 presents the study on embedding watermarks in the neural networks on the IMDB dataset using TextBack by fine tuning with Trigger samples and clean samples.

TABLE 6

| Model | Correct Samples | Train Accuracy | Test Accuracy | Trigger Accuracy |
|---|---|---|---|---|
| Vanilla RNN | 0 | 61.58% | 30.54% | 100% |
| | 1000 | 58.40% | 52.46% | 100% |
| | 3000 | 87.10% | 79.08% | 100% |
| | 5000 | 88.56% | 81.80% | 100% |
| LSTM | 0 | 9.14% | 14.39% | 100% |
| | 100 | 53.90% | 53.84% | 100% |
| | 200 | 77.78% | 73.20% | 100% |
| | 500 | 90.7% | 84.66% | 100% |
| | 1000 | 96.46% | 89.58% | 100% |
| | 2000 | 96.51% | 91.63% | 100% |

Table 7 presents the study on embedding watermarks in the neural networks on the Twitter dataset using TextBack by fine tuning with Trigger samples and clean samples.

TABLE 7

| Model | Correct Samples | Train Accuracy | Test Accuracy | Trigger Accuracy |
|---|---|---|---|---|
| Vanilla RNN | 0 | 48.30% | 46.55% | 100% |
| | 10000 | 87.38% | 75.84% | 99% |
| LSTM | 0 | 25.30% | 25.39% | 100% |
| | 100 | 72.00% | 65.00% | 100% |
| | 200 | 73.39% | 66.05% | 100% |
| | 500 | 85.60% | 77.11% | 90% |
| | 1000 | 86.91% | 78.81% | 100% |
| | 5000 | 88.66% | 79.81% | 100% |
| | 10000 | 89.01% | 80.05% | 100% |

Table 8 presents the study on the computational cost of embedding watermarks by using TextBack by the data poisoning approach, where the model is trained from scratch.

TABLE 8

| Model/Dataset | Epochs | Batch-size | Training Accuracy | Test Accuracy | Trigger Ancurcy |
|---|---|---|---|---|---|
| Model: LSTM Dataset: IMDB | 1 | 64 | 61.97% | 52.34% | 16% |
| | 10 | 64 | 95.35% | 34.78% | 28% |
| | 20 | 64 | 99.23% | 87.63% | 59% |
| | 30 | 64 | 99.12% | 59.57% | 82% |
| | 40 | 64 | 99.51% | 90.43% | 92% |
| | 52 | 64 | 100.00% | 91.00% | 100% |
| Model: LSTM Dataset: Twitter | 180 | 2048 | 94.45% | 76.16% | 87% |
| | 220 | 4096 | 97.38% | 76.34% | 90% |
| | 300 | 4006 | 99.32% | 80.82% | 99% |

Figure 6:
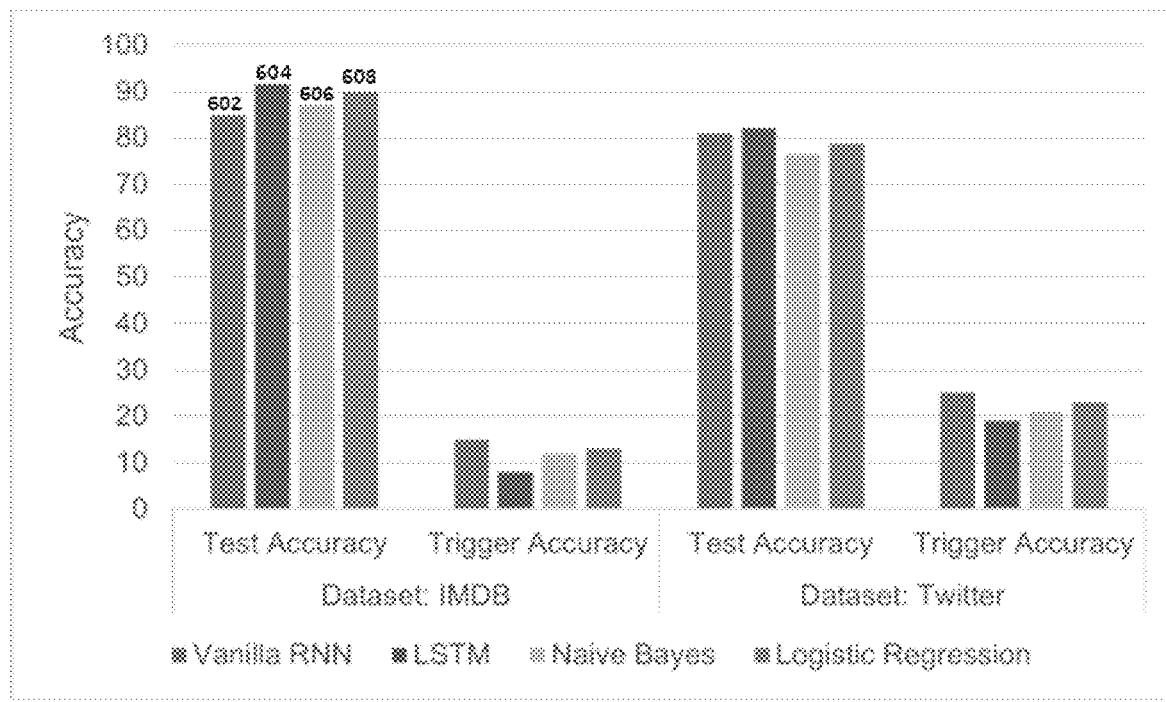
FIG. 6 illustrates benchmarking models and evidence of non-watermarked models in lacking of capabilities to establish ownership.

In the present disclosure, we compared the Test Accuracy and Trigger Accuracy on four models as shown in FIG. 6, based on the databases of IMDB and Twitter, respectively, as seen in FIG. 6, with the plots from left to right being: Vanilla RNN 602, LSTM 604, Naive Bayes 606 and Logistic Regression 608. Although numerals have only been applied to the results for the Test Accuracy on the IMDB database, the same order and models are used for the other three datasets shown in FIG. 6. Some of the most significant observations and takeaways are mentioned here. First, the benchmarking of the models justify the choices of neural architectures as evident through the Test Accuracy. The Trigger Accuracy on the non-watermarked models substantiate the claim that they cannot be used for any verifiable proof of ownership, as seen in FIG. 6.

Figure 7:
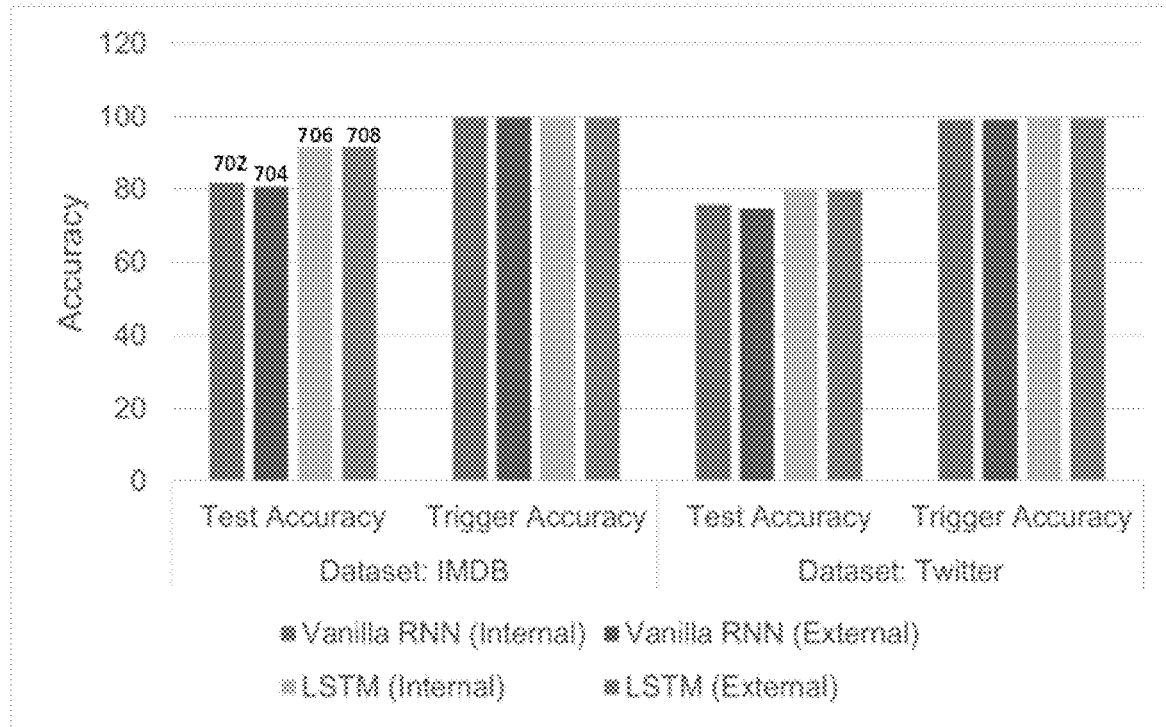
FIG. 7 illustrates Demonstration of TextBack's capability to serve as a verifiable proof of ownership whilst being functionality preserving.

Second, upon watermarking the models with TextBack, the high performance of the watermarked models on the Trigger Set (of both kinds, Internal and External) is the verifiable proof of ownership of the model. In the present disclosure, we compared the Test Accuracy and Trigger Accuracy on four models as shown in FIG. 7, based on the databases of IMDB and Twitter, respectively, as seen in FIG. 7 with the plots from left to right being: Vanilla RNN (Internal) 702, Vanilla RNN (External) 704, LSTM (Internal) 706, and LSTM (External) 708. Although numerals have only been applied to the results for the Test Accuracy on the IMDB database, the same order and models are used for the other three datasets shown in FIG. 7. It is to be noted here that the introduction of the watermarks do not disturb the performance of the original model, with the accuracy on the Test Set being in the range of 1-2% of the nonwatermarked model, as shown in FIG. 7.

Third, an interesting nuance of embedding watermarks within text classifier neural networks is that during the fine tuning with the Trigger samples using Transfer Learning process, clean samples also need to be added to the mix. This is necessary for maintaining the functionality preserving property, as seen from Tables 6 and 7 For every specific combination of dataset and neural architecture, the corresponding size of clean samples needed is presented in the results.

Fourth, instead of fine tuning the pre-trained models, if the models were to be trained from scratch with the Trigger samples and clean samples together, then the computational cost would be higher, in terms of epochs needed to train for, as evident from the results shown in Table 8.

TextBack therefore satisfies the conditions necessary for being an effective watermarking scheme. The functionality preservation aspect has been experimentally verified. The ownership is not trivial because the Trigger Set is unique, and extremely difficult to replicate. TextBack's embedded watermarks are unremovable and unforgeable owing to the properties it inherits from backdooring, where both Trigger samples and their labels are necessary for verification. This makes TextBack robust and reliable for practical use-cases.

In general, watermarking neural networks is necessary for establishing verifiable proof of ownership on trained models. This is a critical requirement for those stakeholders investing in the process of curating the training data and training the models. TextBack is a watermarking scheme for text classifier neural networks that uses backdooring to embed watermarks. Like any watermarking scheme TextBack has a dedicated Key Creation process where a Trigger set can be generated in two different ways, using samples within the distribution or from outside, known as Internal and External respectively. The TextBack marking process is different to most other watermarking schemes because as a necessary requirement for text modelling neural networks, it involves transfer learning based fine tuning using both the Trigger samples and some clean samples. The verification is done using the Trigger set, which is the private key in this case and resides only with the owner of the model. TextBack can also be used for more complex natural language understanding tasks using larger neural networks, for example, transformers.

As a result of the foregoing, a system is disclosed for watermarking a neural network that is trained using a training set of samples. The system comprises memory and at least one compute unit in communication with the memory. The at least one compute unit is configured to:
 generate a trigger set by:
  obtaining examples from the training set by random sampling from the training set, respective examples being associated with respective true classes of said plurality of classes;
  generate a set of adversarial examples by structured perturbation of the examples; generate adversarial class labels for the adversarial examples by passing the adversarial examples to the neural network; and
  apply trigger labels to the adversarial examples, wherein the trigger labels are selected randomly from the plurality of classes, and wherein each trigger label is not the true class label for the corresponding example or the adversarial class label for the corresponding adversarial example;
 store the adversarial examples and corresponding trigger labels as the trigger set; and
 perform a tuning process to adjust parameters at each layer of the neural network using the trigger set, to thereby generate a watermarked neural network.

Figure 8:
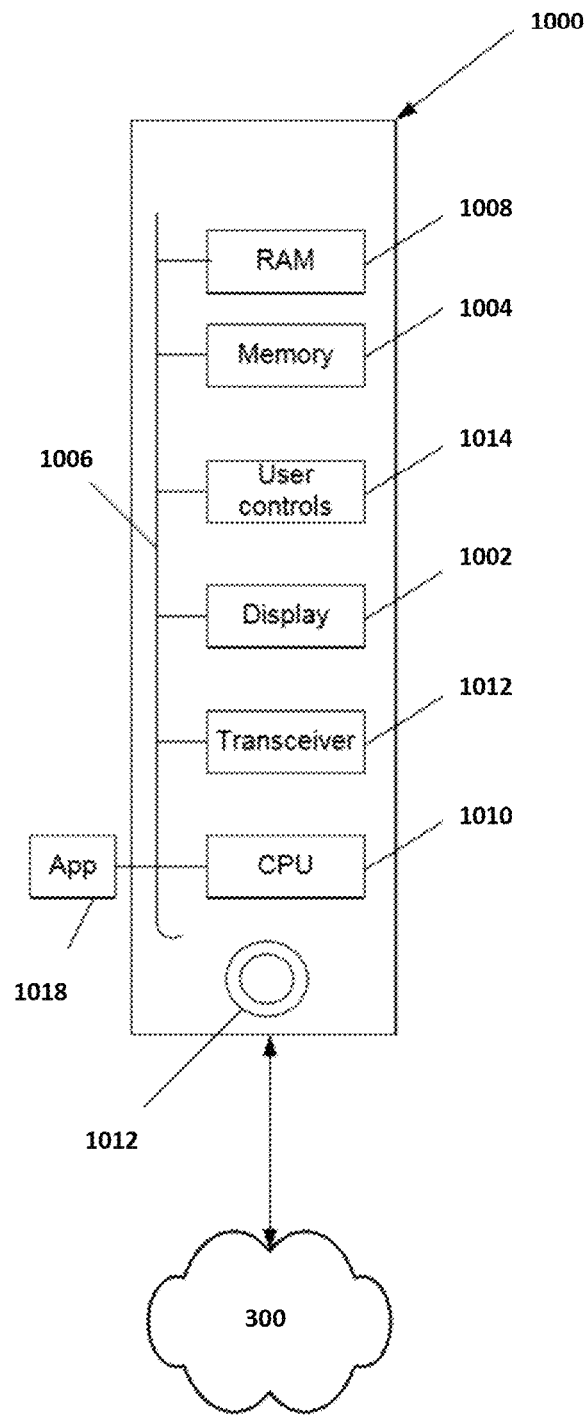
FIG. 8 is a schematic diagram showing components of an exemplary computer system for performing the methods described herein.

FIG. 8 is a block diagram showing an exemplary computer device 1000, in which embodiments of the invention may be practiced. The computer device 1000 may be a mobile computer device such as a smart phone, a wearable device, a palm-top computer, and multimedia Internet enabled cellular telephones when used in training the model, and, for use in controlling a vehicle or other machine for autonomous driving, may be an on-board computing system or a mobile device such as an iPhone™ manufactured by Apple™, Inc or one manufactured by LG™, HTC™ and Samsung™, for example, or other device in communication with the vehicle or other machine and configured to send control commands thereto and to receive information on human interventions from the vehicle or other machine.

As shown, the mobile computer device 1000 includes the following components in electronic communication via a bus 1006:
 a display 1002;
 non-volatile (non-transitory) memory 1004;
 random access memory ("RAM") 1008;

N processing components (referenced as CPU 1010), which may include the compute unit such that processes performed by the compute unit are executed by the N processing components;

a transceiver component 1012 that includes N transceivers; and user controls 1014.

Although the components depicted in FIG. 8 represent physical components, FIG. 8 is not intended to be a hardware diagram. Thus, many of the components depicted in FIG. 8 may be realized by common constructs or distributed among additional physical components. Moreover, it is certainly contemplated that other existing and yet-to-be developed physical components and architectures may be utilized to implement the functional components described with reference to FIG. 8.

The display 1002 generally operates to provide a presentation of content to a user, and may be realized by any of a variety of displays (e.g., CRT, LCD, HDMI, micro-projector and OLED displays).

In general, the non-volatile data storage 1004 (also referred to as non-volatile memory) functions to store (e.g., persistently store) data and executable code. The system architecture may be implemented in memory 1004, or by instructions stored in memory 1004.

In some embodiments for example, the non-volatile memory 1004 includes bootloader code, modem software, operating system code, file system code, and code to facilitate the implementation components, well known to those of ordinary skill in the art, which are not depicted nor described for simplicity.

In many implementations, the non-volatile memory 1004 is realized by flash memory (e.g., NAND or ONENAND memory), but it is certainly contemplated that other memory types may be utilized as well, such as DRAM, BRAM, and multi-level implementations for scratchpad memory, and may include on-chip and/or off-chip memory. Although it may be possible to execute the code from the non-volatile memory 1004, the executable code in the non-volatile memory 1004 is typically loaded into RAM 1008 and executed by one or more of the N processing components 1010.

The N processing components 1010 in connection with memory 1008 generally operate to execute the instructions stored in non-volatile memory 1004. As one of ordinarily skill in the art will appreciate, the N processing components 1010 may include a video processor, modem processor, DSP, graphics processing unit (GPU), and other processing components. The N processing components may comprise the compute unit and therefore include the general matrix multiplication core, VPU and/or other components depending on the particular implementation.

The transceiver component 1012 includes N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks.

The system 1000 of FIG. 8 may be connected to any appliance 418, such as one or more cameras mounted to the vehicle, a speedometer, a weather service for updating local context, or an external database from which context can be acquired.

It should be recognized that FIG. 8 is merely exemplary and in one or more exemplary embodiments, the functions described herein may be implemented in hardware, software, firmware, or any combination thereof. If implemented in software, the functions may be stored on or transmitted over as one or more instructions or code encoded on a non-transitory computer-readable medium 1004. Non-transitory computer-readable medium 1004 includes both computer storage medium and communication medium including any medium that facilitates transfer of a computer program from one place to another. A storage medium may be any available medium that can be accessed by a computer.

It will be appreciated that many further modifications and permutations of various aspects of the described embodiments are possible. Accordingly, the described aspects are intended to embrace all such alterations, modifications, and variations that fall within the spirit and scope of the appended claims.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A system for watermarking a neural network, comprising:
   memory; and
   at least one processor in communication with the memory;
   wherein the memory stores instructions for causing the at least one processor to carry out a method comprising:
      generating a trigger set by:
         obtaining examples from a training set by random sampling from the training set, respective examples being associated with respective true classes of a plurality of classes;
         generating a set of adversarial examples by structured perturbation of the examples, by the fast gradient sign method;
         generating, for each adversarial example, one or more adversarial class labels by passing the adversarial example to the neural network; and
         applying one or more trigger labels to each said adversarial example, wherein the one or more trigger labels are selected randomly from the plurality of classes, and wherein each trigger label is not a said true class label for the corresponding example or a said adversarial class label for the corresponding adversarial example; and
         storing the adversarial examples and corresponding trigger labels as the trigger set; and
      performing a tuning process to adjust parameters at each layer of the neural network using the trigger set, to thereby generate a watermarked neural network.

2. A system according to claim 1, wherein the random sampling is performed evenly across the plurality of classes.

3. A system according to claim 1 wherein said tuning process comprises a sequence of epochs, and wherein each epoch comprises generating an updated neural network by (i) updating parameters for each layer separately using the trigger set while keeping parameters for all other layers fixed.

4. A system according to claim 3, wherein each epoch comprises (ii) determining a classification accuracy $S_{acc}$ of the updated neural network for a test set and a classification accuracy $T_{acc}$ of the updated neural network for the trigger set.

5. A system according to claim 4, wherein (i) and (ii) are performed for each epoch in sequence until $T_{acc}$ starts to saturate and/or $S_{acc}$ begins to decrease.

6. A system according claim 1, wherein the watermarked neural network is configured to be verified based on the adversarial examples and the trigger labels.

7. A system according to claim 1, wherein the instructions cause the at least one processor to:
 obtain the examples from the training set by obtaining out-of-domain examples; and
 generate the adversarial examples by structured perturbation of the examples and of the out-of-domain examples.

8. A system according to claim 1, wherein performing the tuning process to adjust the parameters at each layer of the neural network uses both the trigger set and one or more clean samples.

9. A method of watermarking a neural network that is trained using a training set of samples, the neural network being configured to classify samples into one of a plurality of classes, the method comprising:
 generating a trigger set by:
  obtaining examples from the training set by random sampling from the training set, respective examples being associated with respective true classes of a plurality of classes;
  generating a set of adversarial examples by structured perturbation of the examples, by the fast gradient sign method;
  generating, for each adversarial example, one or more adversarial class labels by passing the adversarial example to the neural network; and
  applying one or more trigger labels to each said adversarial example, wherein the one or more trigger labels are selected randomly from the plurality of classes, and wherein each trigger label is not a said true class label for the corresponding example or a said adversarial class label for the corresponding adversarial example; and
  storing the adversarial examples and corresponding trigger labels as the trigger set; and
 performing a tuning process to adjust parameters at each layer of the neural network using the trigger set, to thereby generate a watermarked neural network.

10. A method according to claim 9, wherein the random sampling is performed evenly across the plurality of classes.

11. A method according to claim 9, wherein said tuning process comprises a sequence of epochs, and wherein each epoch comprises generating an updated neural network by (i) updating parameters for each layer separately using the trigger set while keeping parameters for all other layers fixed.

12. A method according to claim 11, wherein each epoch comprises (ii) determining a classification accuracy $S_{acc}$ of the updated neural network for a test set and a classification accuracy $T_{acc}$ of the updated neural network for the trigger set.

13. A method according to claim 12, wherein (i) and (ii) are performed for each epoch in sequence until $T_{acc}$ starts to saturate and/or $S_{acc}$ begins to decrease.

14. A method according to claim 9, wherein the watermarked neural network is configured to be verified based on the adversarial examples and the trigger labels.

15. A method according to claim 10, wherein obtaining the examples from the training set comprises obtaining out-of-domain examples.

16. A method according to claim 10, wherein performing the tuning process to adjust the parameters at each layer of the neural network to thereby generate a watermarked neural network is by using the trigger set and clean samples.

17. Non-transitory computer-readable storage having machine-readable instructions stored thereon for watermarking a neural network, causing at least one processor to:
 generating a trigger set by:
  obtaining examples from the training set by random sampling from the training set, respective examples being associated with respective true classes of a plurality of classes;
  generating a set of adversarial examples by structured perturbation of the examples, by the fast gradient sign method;
  generating, for each adversarial example, one or more adversarial class labels by passing the adversarial example to the neural network; and
  applying one or more trigger labels to each said adversarial example, wherein the one or more trigger labels are selected randomly from the plurality of classes, and wherein each trigger label is not a said true class label for the corresponding example or a said adversarial class label for the corresponding adversarial example; and
  storing the adversarial examples and corresponding trigger labels as the trigger set; and
 performing a tuning process to adjust parameters at each layer of the neural network using the trigger set, to thereby generate a watermarked neural network.

* * * * *